Sept. 11, 1923.

H. WATZMAN

MEANS FOR REPLENISHING STORAGE BATTERIES WITH WATER

Filed Nov. 12, 1921

1,467,966

Inventor,
Harry Watzman
By Jas. L. Skidmore
his Attorney.

Patented Sept. 11, 1923.

1,467,966

UNITED STATES PATENT OFFICE.

HARRY WATZMAN, OF WASHINGTON, DISTRICT OF COLUMBIA.

MEANS FOR REPLENISHING STORAGE BATTERIES WITH WATER.

Application filed November 12, 1921. Serial No. 514,331.

*To all whom it may concern:*

Be it known that I, HARRY WATZMAN, a citizen of the United States, residing at Washington, District of Columbia, have invented certain new and useful Improvements in Means for Replenishing Storage Batteries With Water, of which the following is a specification.

My invention relates to new and novel devices for automatically maintaining a certain predetermined level of liquid within each of the cells of electric storage batteries of the ordinary type used in connection with automobiles, and it has particular relation to automatically operated means for periodically supplying distilled water to the battery jars or cans from time to time as they become depleted to maintain the proper level of the liquid in each of the cells thereof, whereby the battery will require a minimum of attention on the part of the user. It will be readily seen, however, that the devices may obviously be employed for introducing liquids into batteries of other types, as well as for the filling of other receptacles.

The main object of this invention is to provide novel, simple, economical and efficient devices for the purposes above referred to.

Further objects of the invention are to so construct the devices as to dispense with the employment of such means as are liable to leak after a certain amount of wear and tear; and to provide means such as an electric light, or other device, which serves to indicate the proper operation of the devices employed.

The foregoing and such other objects as may appear from the ensuing description are attained by the construction, arrangement, location and combination of the parts hereinafter more fully described, illustrated by the accompanying drawings, and particularly set forth in the claims appended hereto, it being understood that slight changes in the precise form, proportions and minor details of the construction may be resorted to without departing from the spirit or sacrificing any of the advantages of the invention.

In the accompanying drawings forming a part of the specification it will be seen that:—

Similar numerals of reference are employed to designate like parts in the several views of the drawings.

Figure 1:
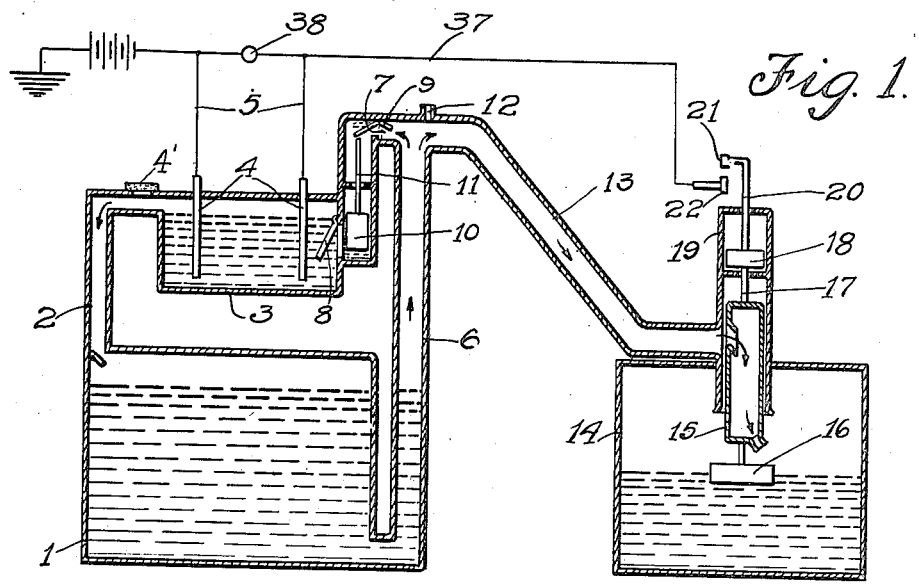
Figure 1 is a diagrammatic view of the devices embodying my invention connected together.
Figure 2:
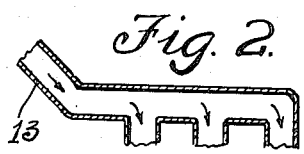
Figure 2 is a sectional detail showing the water distributing pipe leading to the battery.

In the embodiment of my invention as illustrated, and referring first to Fig. 1, it will be seen that I provide a main tank 1 preferably filled to a suitable level with distilled water, said tank being connected at its upper end portion by means of a suitable pipe 2 with a small auxiliary tank 3, preferably disposed slightly above the main tank, said auxiliary tank containing a weak solution of sulphuric acid and water and two electrodes 4 connected to electrical feed wires 5. Connected with the tank 3 from the stand pipe 6, the latter leading from the bottom portion of the main tank, is a water passage-way 7, for the purpose of replenishing the supply of water in the auxiliary tank as it is used up by electrolysis in the manner hereinafter described. This passage-way 7, at the juncture of the auxiliary tank, is provided with a pivoted one-way valve 8, so that water may enter but will not be permitted to leave said tank. It is also provided with another pivoted swinging valve 9, at its juncture with the stand pipe 6, said valve 9 being actuated by a float 10 conveniently located within the passage-way, said float having an upwardly extended stem 11 which contacts with the valve and is released therefrom to close and open said valve by the rise and fall of the float as will be readily understood. The float itself may be untilized as a valve by closing a small opening surrounding the stem as it rises and falls in said passage-way in order to regulate the amount of water supplied to the auxiliary tank.

The stand pipe 6 is provided at the top thereof with a suitable vent 12, and after the water reaches the desired level it flows into a downwardly inclined pipe 13 and falls by gravity into the lower end thereof from whence it is fed into the respective cells of the battery 14, as indicated by the arrows.

A pipe valve 15 is slidingly connected to the delivery ends of the pipe 13 within each cell of the battery, with its bottom end connected with a float 16, which rides upon the electrolyte, while the upper end of said valve is provided with an upwardly extended rod or stem 17, to which is connected a piston 18, which operates within a cylindrical member 19, and is adapted to retard or check any sudden up or down motion of the pipe valve by compressing the air within the cylindrical member before it can escape. Connected to said piston 18 is an upwardly projecting rod 20 with a contact 21 disposed at the upper end portion thereof, which is adapted to contact with another electric contact 22 and close an electric circuit when the float reaches a certain predetermined low level within the battery, and to break the circuit when the float is caused to rise to a predetermined high level.

It will be readily perceived that when the floats in the battery are allowed to fall below a certain level the electric circuit will be closed thereby causing an electric current to flow through the electrodes 4 into the solution contained in the auxiliary tank, thus generating a gas within said tank which is caused to flow into the main water tank 1, said gas exerting sufficient pressure upon the surface of the water within said tank 1 to cause the water to be forced up the stand pipe and into the passage-way 7 and the pipe 13 to replenish the required amount of water desired, and to maintain the proper level of the liquid in the auxiliary tank and the storage battery, respectively, and when the proper level is reached the current will be automatically broken.

It will be readily understood that the electrical circuit is grounded by suitable means (not shown) connected with the cylindrical member 19.

It will be seen that the upper portion of the auxiliary tank is provided with a section of porous material 4' adapted to permit the slow escape of gas under pressure from the tank when the electrical circuit is broken.

Figure 3:
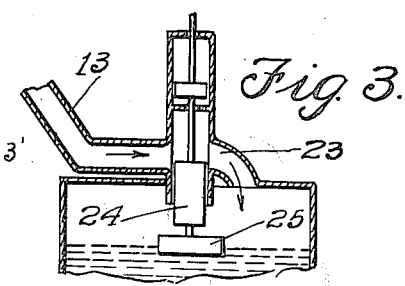
Figure 3 is a sectional elevation showing a slightly modified form of water distributing inlet in connection with the battery.

By reference to Fig. 3 it will be seen that a slightly modified form of water inlet to the battery is shown, the water entering the battery through the inlet 23, and the valve 24 being formed with a cylindrical wall adapted to close and open the pipe 13 as the float 25 is caused to rise and fall.

Figure 4:
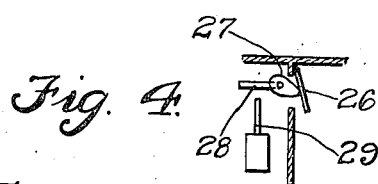
Figure 4 is a detail partly in section and partly in elevation showing a slightly modified form of valve operating means.

In Fig. 4 is shown a slightly modified form of valve and operating means, the same consisting of a pivoted flap or gate valve 26, adapted to be actuated by a cam 27, having an outwardly extended arm 28 rigidly secured to the cam, and said arm by gravity causes the cam to be moved outwardly to open the valve, and when the float is caused to rise, the rod or stem 29 connected with the float will contact with said arm 28 and cause the cam to release the valve into closed position.

Figure 5:
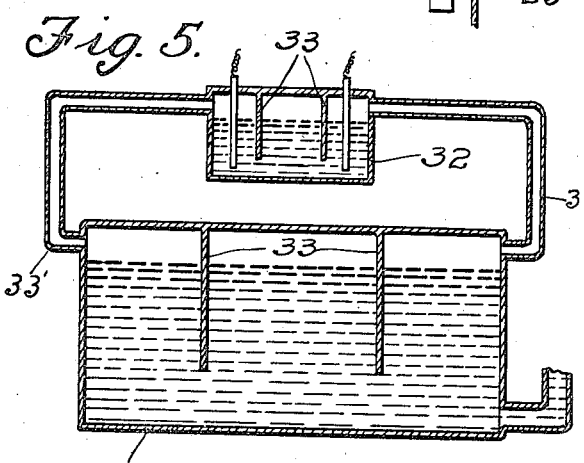
Figure 5 is a sectional elevation showing a slightly modified form of main and auxiliary tanks.

As shown in Fig. 5, the main tank 31 and auxiliary tank 32 are each provided with partitions 33 to move inwardly and thus divide said tanks into a plurality of sections in such a manner that the water which is lower will all be in the same compartment and the different gases be in different compartments. The two gases, oxygen and hydrogen would then be led into the main tank through the separate pipes 33'.

Figure 6:
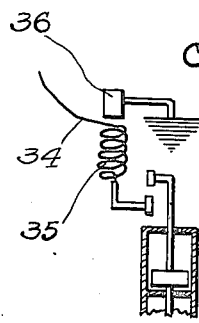
Figure 6 is a detail partly in section and partly in elevation showing a modified form of conducting the electric circuit to ground.

In the modification shown in Fig. 6, it will be seen that the electric wire 34 is formed into a coil 35, thereby forming a magnet to attract the metallic plate 36, thus forming an additional ground for the current, which means is only adopted when the usual ground of the circuit through the machine proves unsatisfactory.

It will be observed that I provide an electrical circuit 37 which passes through the electric light 38, and also through the auxiliary tank 3 by means of the feed wires 5 and electrodes 4, said light 38, or other suitable device, serving to indicate the proper operation of the mechanism employed.

It will be understood that the floats may be made of any suitable or desirable material, and if required, the battery cell float may be formed of a plurality of sections.

The operation of the device may be briefly described as follows:

When the liquid in the battery cells falls below the desired predetermined level, the float falls, thereby causing the electric current to be closed, thus creating an electric current which flows through the electrodes into the solution in the auxiliary tank causing the generation of a gas within said tank, said gas being led under pressure from thence to the upper end portion of the main water tank forces the water from the bottom portion of the main tank through the stand pipe, from whence it is delivered into the auxiliary tank and battery cells, respectively, until the desired liquid level is reached at which time the inlets to the said auxiliary tank and battery cells are automatically closed by the rising of the respective floats connected therewith, whereby the liquid level therein is always maintained at the proper and desired level.

It will be obvious that the main tank may be provided with any suitable inlet at the top thereof, whereby it may be readily filled with distilled water when desired or required.

Having thus described my invention what I claim and desire to secure by Letters Patent is:—

1. A device of the character described, comprising a main water tank, an auxiliary tank containing a solution of sulphuric acid and water and provided with means communicating with said main tank, electrodes within the solution in the auxiliary tank, an electrical circuit connected with said electrodes, a stand pipe connected with the bottom of the main tank, a water distributing pipe connecting said stand pipe with a storage battery, and automatically actuated means operated by the level of the liquid in the battery for maintaining a certain level of liquid within said battery.

2. A device of the character described, comprising a main water tank, an auxiliary tank containing a solution of sulphuric acid and water and provided with means communicating with the main tank, electrodes within said solution, an electric circuit connected with the electrode, a stand pipe connected to the lower end of said main tank, a storage battery, a water delivery pipe connecting the battery with said stand pipe, and automatically actuated means connecting the delivery pipe with the battery whereby the liquid within the battery is maintained at the desired level.

3. A device of the character described, comprising an auxiliary tank containing a solution of sulphuric acid and water, electrodes within said solution, an electric circuit connected with said electrodes, a main water tank provided with means communicating with the auxiliary tank and disposed below the latter, a stand pipe connected with the lower end of the main tank, automatically actuated means connecting the auxiliary tank with the upper end of said stand pipe, a storage battery, a water delivery pipe connecting the stand pipe with the battery, and automatically actuated means connecting the delivery pipe and battery whereby the liquid in the battery is maintained at a predetermined level.

4. A device of the character described, comprising an auxiliary tank containing a solution of sulphuric acid and water, electrodes within said solution, an electric circuit connected with said electrodes, a main water tank, means communicating with said tanks, a stand pipe connected with the bottom of the main tank, automatically actuated means at one end of the auxiliary tank and connected with the upper end of the stand pipe for maintaining the proper level of the solution within said auxiliary tank, a water delivery pipe connecting the stand pipe with a storage battery, and automatically operated means connecting the discharge pipe with the battery for maintaining the desired liquid level within said battery.

5. A device of the character described, comprising a main water tank, an auxiliary tank containing a solution of sulphuric acid and water disposed above said main tank, electrodes within said solution, an electric circuit connected with the electrodes, a stand pipe connected with the bottom of the main tank, automatically actuated means connected with one end of the auxiliary tank and the upper end of the stand pipe for maintaining the proper level of the solution within said auxiliary tank, a water delivery pipe connected with the upper end of the stand pipe and with the top portion of a storage battery, and automatically operated means connecting the delivery pipe with the battery adapted to maintain a certain level of the liquid within said battery.

6. A device of the character described, comprising a main water tank, an auxiliary tank disposed above the main tank having a solution of sulphuric acid and water therein, electrodes arranged within said solution, an electric circuit connecting said electrodes, means communicating with said tanks, a stand pipe leading from the bottom of the main tank, means connected with one end of the auxiliary tank and the upper end of the stand pipe for maintaining a proper level of the solution within the auxiliary tank, a storage battery, a discharge pipe connecting the stand pipe with the battery, and means connecting the discharge pipe with the battery for maintaining the desired level of liquid within said battery.

7. A device of the character described, comprising a main water tank, an auxiliary tank containing a solution of sulphuric acid and water, electrodes within said solution, an electric circuit connected with said electrodes, means forming a communication between said tanks, a stand pipe connected with the lower end of the main tank, means connected at one end of the auxiliary tank and the top of the discharge pipe for maintaining the desired level of the solution within said auxiliary tank, a water discharge pipe connected with the top of the stand pipe, a storage battery, a cylindrical member connected with said battery, and means enclosed within said member for automatically actuating means for maintaining the proper level of liquid within the battery.

HARRY WATZMAN.